United States Patent [19]

Hamano

[11] Patent Number: 4,790,215

[45] Date of Patent: Dec. 13, 1988

[54] METHOD AND SYSTEM FOR CONTROL OF TWO PART TYPE TRANSMISSION PROVIDING LIMITED TIME FOR AUXILIARY TRANSMISSION OVERDRIVE ENGAGEMENT WITH MAIN TRANSMISSION SPEED REDUCTION ENGAGEMENT

[75] Inventor: Yukio Hamano, Toyota, Japan

[73] Assignee: Toyota Jidosha Kabushiki Kaisha, Toyota, Japan

[21] Appl. No.: 133,232

[22] Filed: Dec. 14, 1987

Related U.S. Application Data

[63] Continuation of Ser. No. 878,620, Jun. 26, 1986, abandoned.

[30] Foreign Application Priority Data

Jun. 26, 1985 [JP] Japan .................... 60-139983

[51] Int. Cl.⁴ .................................. B60K 41/06
[52] U.S. Cl. .......................... 74/866; 74/864
[58] Field of Search ................ 74/864, 865, 866

[56] References Cited

U.S. PATENT DOCUMENTS

| 4,155,277 | 5/1979 | Minami et al. | 74/866 |
| 4,282,780 | 8/1981 | Totani et al. | 74/866 |
| 4,312,248 | 1/1982 | Sugimoto et al. | 74/864 |
| 4,486,838 | 12/1984 | Itoh et al. | 74/866 |
| 4,509,124 | 4/1985 | Suzuki et al. | 74/866 |
| 4,560,024 | 12/1985 | Noda et al. | 74/866 |
| 4,640,393 | 2/1987 | Nishimura et al. | 74/865 |

FOREIGN PATENT DOCUMENTS

| 47-39861 | 12/1972 | Japan . |
| 56-24246 | 3/1981 | Japan . |
| 57-179460 | 11/1982 | Japan . |
| 58-38186 | 8/1983 | Japan . |
| 61-55451 | 3/1986 | Japan . |

Primary Examiner—Leslie A. Braun
Assistant Examiner—Dwight G. Diehl
Attorney, Agent, or Firm—Oblon, Fisher, Spivak, McClelland & Maier

[57] ABSTRACT

In the control of a vehicle automatic transmission having a series connection of an overdrive gear mechanism and an underdrive gear mechanism, the overdrive gear being switched over between direct connection and overdrive both when the underdrive gear mechanism is switched to direct connection and to speed reduction, a maximum limit is set for the period over which the overdrive gear mechanism is switched to overdrive while the underdrive gear mechanism is switched to speed reduction, such a maximum period being determined according to a vehicle operational parameter such as vehicle speed, throttle opening or transmission fluid temperature.

36 Claims, 4 Drawing Sheets

METHOD AND SYSTEM FOR CONTROL OF TWO PART TYPE TRANSMISSION PROVIDING LIMITED TIME FOR AUXILIARY TRANSMISSION OVERDRIVE ENGAGEMENT WITH MAIN TRANSMISSION SPEED REDUCTION ENGAGEMENT

This application is a continuation of application Ser. No. 878,620, filed on June 26, 1986, now abandoned.

BACKGROUND OF THE INVENTION

The present invention relates to a method and system for control of a two part type transmission including an auxiliary gear transmission mechanism and a main gear transmission mechanism provided in series in a vehicle power train, and more particularly relates to such a transmission system method and control which minimize wear on transmission elements.

The present patent application has been at least partly prepared from material included in Japanese Patent Application Ser. No. Showa 60-139983, which was filed by an applicant the same as the assignee or entity owed duty of assignment of the present patent application, and the present application hereby incorporates into itself by reference the text of said Japanese Patent Application and the claims and the drawings thereof.

There are various known types of two part type transmission including, in series in a vehicle power train, an auxiliary gear transmission mechanism and a main gear transmission mechanism; and typically the auxiliary gear transmission mechanism is a so called overdrive mechanism which is controllable to provide either a directly connected speed stage or a speed increasing overdrive speed stage between its power input shaft and its power output shaft, while the main gear transmission mechanism is controllable to provide either a directly connected speed stage or at least one speed reducing speed stage (and typically two such speed reducing speed stages) between its power input shaft and its power output shaft. And typically the auxiliary gear transmission mechanism is connected between the vehicle engine and the main gear transmission mechanism. Such a two part type transmission is, for example, disclosed in Japanese Patent Laying Open Publication No. 57-179460.

With such a two part type transmission, if the auxiliary gear transmission mechanism is switched between its directly connected speed stage and its speed increasing overdrive speed stage, not only when the main gear transmission mechanism is switched to its directly connected speed stage, but also when said main gear transmission mechanism is switched to one or more of its speed reduction speed stages, then a relatively large number of speed stages of the transmission as a whole may be provided. Such systems are disclosed, for example in Japanese Patent Applications Ser. Nos. 46-26604 (1965) and 59-176299 (1984), which were both applied for by an applicant who is also the applicant of the Japanese patent application of which the priority is being claimed for the present patent application, and none of which is it intended hereby to admit as prior art to the present patent application except to the extent otherwise required by applicable law.

A problem that has occurred with such a system is as follows. In the above outlined construction, during the condition when the auxiliary gear transmission mechanism is switched to its speed increasing overdrive speed stage, the rotational speed of the power input shaft of the main gear transmission mechanism is relatively high, so that, if said main gear transmission mechanism is at this time switched to one of its speed reduction speed stages, then there is relatively rapid rotation between mutually rotating elements such as gears and shafts and so on of said main gear transmission mechanism, and this can cause the rate of wear on said mutually rotating elements to be higher than desirable.

SUMMARY OF THE INVENTION

Accordingly, it is the primary object of the present invention to provide a method for control of such a two part type transmission, which minimizes wear on the mutually rotating elements thereof, and particularly minimized wear on such mutually rotating elements of the main gear transmission mechanism.

According to the most general method aspect of the present invention, these and other objects are attained by, for an automatic transmission comprised in a vehicle which further comprises driven wheels and an internal combustion engine which comprises a power output shaft, comprising: (a) an auxiliary gear transmission mechanism, comprising a power input shaft rotationally connected to said power output shaft of said internal combustion engine and a power output shaft, and switchingly controllable to provide either a directly connected speed stage between its said power input shaft and its said power output shaft or a speed increasing overdrive speed stage between its said power input shaft and its said power output shaft; and: (b) a main gear transmission mechanism, comprising a power input shaft rotationally connected to said power output shaft of said auxiliary gear transmission mechanism and a power output shaft rotationally connected to said driven wheels of said vehicle, and switchingly controllable to provide either a directly connected speed stage between its said power input shaft and its said power output shaft or at least one speed reducing speed stage between its said power input shaft and its said power output shaft: a method of transmission control, wherein: (c) said auxiliary gear transmission mechanism is switched between providing its said directly connected speed stage and providing its said speed increasing overdrive speed stage, both when said main gear transmission mechanism is switched to provide its said directly connected speed stage and when said main gear transmission mechanism is switched to provide its said speed reducing speed stage; and: (d) the time period over which said auxiliary gear transmission mechanism is switched to provide its said speed increasing overdrive speed stage and said main gear transmission mechanism is switched to provide its said speed reducing speed stage is limited to be less than a determinate time period; and, according to the most general apparatus aspect of the present invention, these and other objects are attained by, for an automatic transmission comprised in a vehicle which further comprises driven wheels and an internal combustion engine which comprises a power output shaft, comprising: (a) an auxiliary gear transmission mechanism, comprising a power input shaft rotationally connected to said power output shaft of said internal combustion engine and a power output shaft, and switchingly controllable to provide either a directly connected speed stage between its said power input shaft and its said power output shaft or a speed increasing overdrive speed stage between its said power input shaft and its said power output shaft; and: (b) a main gear transmission mechanism, comprising a power input shaft rotationally connected to said power output shaft of said auxiliary gear transmission mechanism and a power output shaft rotationally connected to said driven wheels of said vehicle, and switchingly controllable to provide either a directly connected speed stage between its said power input shaft and its said power output shaft or at least one speed reducing speed stage between its said power input shaft and its said power output shaft: a system for transmission control, comprising: (c) a means for switching said auxiliary gear transmission mechanism between providing its said directly connected speed stage and providing its said speed increasing overdrive speed stage, both when said main gear transmission mechanism is switched to provide its said directly connected speed stage and when said main gear transmission mechanism is switched to provide its said speed reducing speed stage; and: (d) a means for limiting the time period over which said auxiliary gear transmission mechanism is switched to provide its said speed increasing overdrive speed stage and said main gear transmission mechanism is switched to provide its said speed reducing speed stage to be less than a determinate time period.

According to such a structure, since when the main gear transmission mechanism is not in its directly connected operational condition the auxiliary gear transmission mechanism is prevented from being in the overdrive operational condition for more than said determinate time period, it is ensured that the wear amount on the mutually rotating elements of said main gear transmission mechanism is kept acceptably low.

Further, the severity of the wear conditions for such mutually rotating elements of said main gear transmission mechanism is increased, when the engine rotational speed is increased, or alternatively when the rotational speed of some transmission rotating member is increased, or alternatively when the vehicle road speed is increased. Therefore, according to particular specializations of the present invention, said determinate time period may be reduced, the higher is the value of any one of these vehicle operational parameters. And, when any one of these vehicle operational parameters is lower than some threshold value, it may be considered that no substantial problem of wear of such mutually rotating elements of said main gear transmission mechanism occurs, so that in such a case the value of said determinate time period may be set to be infinite, so as to remove the time limitation on engagement of the overdrive operational condition of the auxiliary gear transmission mechanism. The conditions of wear on such mutually rotating elements of said main gear transmission mechanism will naturally be the severer, the lower is the speed stage of said main gear transmission mechanism; so said threshold value of said vehicle operational parameter may be set lower when said main gear transmission mechanism is in a lower speed reducing speed stage than when it is in a higher speed reducing speed stage. Yet further, the severity of the wear conditions for such mutually rotating elements of said main gear transmission mechanism is increased, when the engine load is increased, or alternatively when the temperature of the transmission fluid is increased because this increases the amount of leakage of said transmission fluid. Therefore, according to other particular specializations of the present invention, said determinate time period may be reduced, the higher is the value of either of these other vehicle operational parameters.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures relating to one preferred embodiment, and like parts and gaps and spaces and so on in the figures relating to different preferred embodiments; and:

DESCRIPTION OF THE PREFERRED EMBODIMENT

The present invention will now be described with reference to the preferred embodiment thereof, and with reference to the figures.

Overall Transmission Structure

Figure 1:
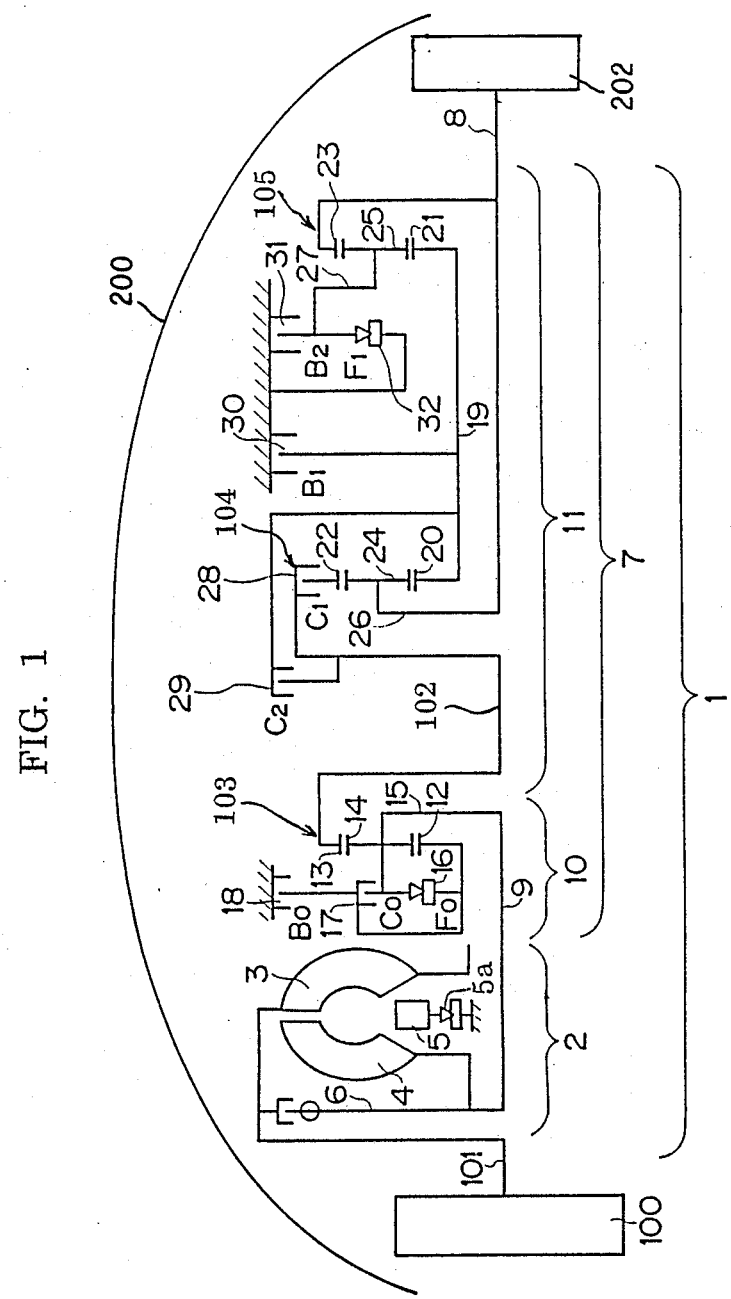
FIG. 1 is a schematic skeleton diagram showing the overall layout of the components of an automatic transmission to which all of the preferred embodiments of the transmission control system and method of the present invention are applied, said automatic transmission including a gear transmission mechanism having three forward speed stage, and an overdrive mechanism having two speed stages.

FIG. 1 is a schematic skeleton diagram showing the overall layout of the components of an automatic transmission, denoted by the reference numeral 1, to which all of the preferred embodiments of the transmission control system and method of the present invention can be applied. In this figure, the automatic transmission 1 is shown as being powered by an internal combustion engine 100 in a vehicle schematically shown at 200 via a shaft 101 which may be a continuation of the crank shaft of said engine 100, and as transmitting output rotational power to a shaft 8 which leads, although this is not particularly indicated in the figures, to a differential device for powering the driven wheels (schematically shown at 202) of the automotive vehicle 200 to which this automatic transmission 1 and this internal combustion engine 100 are fitted.

In more detail, the automatic transmission 1 comprises a fluid torque converter assembly 2 and a gear transmission mechanism 7. The fluid torque converter assembly 2 is supplied with rotational power via the aforementioned power output shaft 101 of the internal combustion engine 100, which thus functions as a power input shaft for said fluid torque converter assembly 2; and a shaft 9 functions as a power output shaft for said fluid torque converter assembly 2 and also as a power input shaft for the gear transmission mechanism 7 and transmits rotational power therebetween.

The fluid torque converter assembly 2 is of a per se conventional three element single stage two phase type with a lock up clutch, and comprises a pump impeller 3 rotationally connected to the power output shaft 101 of the internal combustion engine 1, a turbine member 4 rotationally connected to the power output shaft 9 for said torque converter assembly 2, and a stator member 5 mounted via a one way clutch 5a to the casing of said fluid torque converter assembly 2. In a per se known fashion, by circulation of transmission fluid in the general circulation pattern of a smoke ring around the toroidal shape defined by the pump impeller 3, the turbine member 4, and the stator member 5, torque is transmitted from the pump impeller 3 to the turbine member 4 and thereby from the power input shaft 101 of the fluid torque converter assembly 2 to the power output shaft 9 thereof with a certain amount of slippage and also of torque amplification being provided therebetween, the amount of such slippage and torque amplification being determined by the rotational speed of the power input shaft 101 of the torque converter assembly 2 and also by the output load on its power output shaft 9. A lock up clutch 6 of a per se known sort is provided for, when optionally engaged by the supply of actuating hydraulic pressure thereto from a control system therefor, directly connecting the power input shaft 101 to the power output shaft 9, thus bypassing the above described hydraulic connection for the torque converter assembly and eliminating said slippage and torque amplification provided thereby.

In further detail, the gear transmission mechanism 7 comprises an auxiliary gear transmission mechanism 10 and a main gear transmission mechanism 11. The auxiliary gear transmission mechanism 10 is supplied with rotational power via the aforementioned power output shaft 9 of the fluid torque converter assembly 2, which thus functions as a power input shaft for said auxiliary gear transmission mechanism 10; and a shaft 102 functions as a power output shaft for said auxiliary gear transmission mechanism 10 and also as a power input shaft for the main gear transmission mechanism 11 and transmits rotational power therebetween.

First, the auxiliary gear transmission mechanism 10 will be explained. This mechanism 10 comprises a first planetary gear mechanism 103 which comprises a sun gear 12, a coaxially provided ring gear 13, and a carrier 15 which rotatably supports a plurality of planetary pinions 14 which are meshed with outer teeth formed on the sun gear 12 and with inner teeth formed on the ring gear 13 and which perform planetary motion between said sun gear 12 and said ring gear 13 in a per se conventional manner. The carrier 15 of the planetary pinions 14 is rotationally connected to the power input shaft 9 of the auxiliary gear transmission mechanism 10 to receive rotational power therefrom, and the ring gear 13 is rotationally connected to the power output shaft 102 thereof so as to transmit rotational power thereto. A one way clutch F0 16 is provided for always rotationally connecting the carrier 15 to the sun gear 12 with respect to mutual rotation therebetween in one rotational direction only; a clutch C0 17 is provided for selectively, when operated by selective supply of actuating hydraulic fluid pressure thereto, rotationally connecting the carrier 15 to the sun gear 12 with respect to mutual rotational therebetween in both rotational directions; and a brake B0 18 is provided for selectively, when operated by selective supply of actuating hydraulic fluid pressure thereto, rotationally connecting the sun gear 12 to the casing of the auxiliary gear transmission mechanism 10 with regard to mutual rotation therebetween in both rotational directions. The clutch C0 17 and the brake B0 18 are both per se conventional types of friction engaging mechanisms comprising per se conventional hydraulic actuator systems, and are engaged when hydraulic fluid pressure is supplied to their pressure chambers (not particularly shown), while they are disengaged when no hydraulic fluid pressure is supplied to their said pressure chambers. Thus, by selective engagement and disengagement of the clutch C0 and the brake B0, the auxiliary gear transmission mechanism 10 can be controlled to provide either of two gearing ratios or rotational speed stages between its power input shaft 9 and its power output shaft 102, in a manner which will be clear to one of ordinary skill in the relevant art based upon the above explanations, one of said gearing ratios being unity and thus providing direct connection, while the other of said gearing ratios is a speed increasing or overdrive gearing ratio.

Next, the main gear transmission mechanism 11 will be explained. This mechanism 11 comprises second and third planetary gear mechanisms 104 and 105 which are arranged on the outside of a hollow intermediate shaft 19 which is coaxially fitted over the aforementioned power output shaft 8 of this main gear transmission mechanism 11. The second planetary gear mechanism 104 comprises a sun gear 20, a coaxially provided ring gear 22, and a carrier 26 which rotatably supports a plurality of planetary pinions 24 which are meshed with outer teeth formed on the sun gear 20 and with inner teeth formed on the ring gear 22 and which perform planetary motion between said sun gear 20 and said ring gear 22 in a per se conventional manner. The sun gear 20 is fixed upon the left end in the figure of the intermediate shaft 19, and the carrier 26 for the planetary pinions 24 is rotationally connected to the power output shaft 8 of this main gear transmission mechanism 11. A clutch C1 28 is provided for selectively, when operated by selective and appropriate supply of actuating hydraulic fluid pressure thereto, rotationally connecting said ring gear 22 to the power input shaft 102 of this main gear transmission mechanism 11 with respect to mutual rotation therebetween in both rotational directions. And a clutch C2 29 is provided for selectively, when operated by selective supply of actuating hydraulic fluid pressure thereto, rotationally connecting said power input shaft 102 of this main gear transmission mechanism 11 to the sun gear 20 and to the aforementioned intermediate shaft 19 with respect to mutual rotation therebetween in both rotational directions. The clutch C1 28, which functions as a forward clutch which is engaged when and only when the main gear transmission mechanism 11 is providing forward driving, and the clutch C2 29, which functions as a direct clutch, are per se conventional types of friction engaging mechanisms comprising per se conventional hydraulic actuator systems, and like the clutches C0 17 and C1 18 are engaged when hydraulic fluid pressure is supplied to their actuating pressure chambers (not particularly shown), while they are disengaged when no hydraulic fluid pressure is supplied to their said pressure chambers. The third planetary gear mechanism 105 comprises a sun gear 21, a coaxially provided ring gear 23, and a carrier 27 which rotatably supports a plurality of planetary pinions 25 which are meshed with outer teeth formed on the sun gear 21 and with inner teeth formed on the ring gear 23 and perform planetary motion between said sun gear 21 and said ring gear 23 in a per se conventional manner. The sun gear 21 is fixed on the right end in the figure of the aforementioned intermediate shaft 19, and the ring gear 23 is rotationally connected to the power output shaft 8 of this main gear transmission mechanism 11. A brake B1 30 is provided for selectively, when operated by selective supply of actuating hydraulic fluid pressure thereto, rotationally connecting the aforementioned intermediate shaft 19 to the casing of this main gear transmission mechanism 11 with respect to mutual rotation therebetween in both rotational directions. And a brake B2 31 is provided for selectively, when operated by selective supply of actuating hydraulic fluid pressure thereto, rotationally connecting the carrier 27 for the planetary pinions 25 to said casing of this main gear transmission mechanism 11 with respect to mutual rotation therebetween in both rotational directions. Also, a one way clutch F1 32 is provided for always rotationally connecting said carrier 27 for said planetary pinions 25 to said casing of this main gear transmission mechanism 11 with respect to mutual rotation therebetween in one rotational direction only. The brakes B1 30 and B2 31 again are per se conventional types of friction engaging mechanisms comprising per se conventional hydraulic actuator systems, and like the brake B0 18 are engaged when hydraulic fluid pressure is supplied to their pressure chambers (not particularly shown), while they are disengaged when no hydraulic fluid pressure is supplied to their said pressure chambers Thus, by selective engagement and disengagement of the clutches C1 and C2 and of the brakes B1 and B2, the main gear transmission mechanism 11 can be controlled to provide any one of three forward gearing ratios or rotational speed stages, one of said three forward gearing ratios being a ratio of unity or a directly connected speed stage, and one reverse gearing ratio or rotational speed stage between its power input shaft 102 and its power output shaft 8, in a manner which will be clear to one of ordinary skill in the relevant art based upon the above explanations. And, further, the gear transmission mechanism 7 as a whole, as a combination of the auxiliary gear transmission mechanism 10 (the overdrive mechanism) and the main gear transmission mechanism 11 and by the combined operation thereof, according to selective engagement and disengagement of the clutches C0, C1, and C2 and of the brakes B0, B1 and B2, can be controlled to provide any one of six forward gearing ratios or rotational speed stages including an overdrive speed stage and one reverse gearing ratio or rotational speed stage between its power input shaft 9 and its power output shaft 8, as particularly detailed in the Table which for convenience of pagination is given at the end of the specification and before the claims of the present patent application. In this Table, an "0" in a column relating to a hydraulic clutch or a hydraulic brake indicates that said hydraulic clutch or hydraulic brake is engaged, while an "X" relating to such a hydraulic clutch or hydraulic brake indicates that said hydraulic clutch or hydraulic brake is disengaged; and an "0" in a column relating to a one way clutch indicates that said one way clutch is engaged so as to transmit rotational power when the internal combustion engine 100 is powering the driven wheels (not particularly shown) of the vehicle via the automatic transmission system 1 and on the other hand is free wheeling or disengaged when said engine 100 is not so driving said driven wheels of the vehicle, in other words indicates that said clutch is free wheeling in, and only in, the engine overrun condition; while an "F" relating to a one way clutch indicates that said one way clutch is free wheeling or disengaged. From this Table, it will be understood that: when the automatic transmission 1 is being operated in the drive or "D" range, all six of its forward speed stages including its overdrive speed stage are available to be utilized, according to vehicle operational conditions as will be explained later; but, however, when the automatic transmission 1 is being operated in the second or "S" range, no upshift from the third speed stage to the fourth, the fifth, or the sixth speed stage is ever performed, and only the first through the third speed stages are available to be utilized; and further, when the automatic transmission 1 is being operated in the low or "L" range, no upshift from the second speed stage to the third, the fourth, the fifth, or the sixth speed stage is ever performed, and only the first and the second speed stages are available to be utilized. And further it will be particularly noted from this Table that the hydraulic clutch C1 28 is engaged when, and only when, the gear transmission mechanism 7 is engaged to a forward speed stage (i.e., to the first, second, third, fourth, fifth, or sixth speed stage), and is otherwise disengaged; thus functioning as a forward clutch. And further from this Table it will be noted that, in the "D" or drive range when said forward clutch C1 28 is engaged, for each of the three speed stages of the main gear transmission mechanism 11 by itself, the auxiliary gear transmission mechanism 10 can be set to either of its two switched stages, i.e. the direct speed stage or the overdrive speed stage, thus providing two times three or six speed stages in all for the gear transmission mechanism 7 as a whole; and, in more detail: the switching of the auxiliary gear transmission mechanism 10 between the direct speed stage and the overdrive speed stage, when the main gear transmission mechanism 11 is in its lowest speed stage, respectively switches the gear transmission mechanism 7 as a whole to its first speed stage or to its second speed stage; the switching of said auxiliary gear transmission mechanism 10 between the direct speed stage and the overdrive speed stage, when the main gear transmission mechanism 11 is in its intermediate speed stage, respectively switches the gear transmission mechanism 7 as a whole to its third speed stage or to its fourth speed stage; and the switching of said auxiliary gear transmission mechanism 10 between the direct speed stage and the overdrive speed stage, when the main gear transmission mechanism 11 is in its highest or directly connected speed stage, respectively switches the gear transmission mechanism 7 as a whole to its fifth or directly connected speed stage or to its sixth or overdrive speed stage.

In general, each of the various hydraulic clutches and brakes detailed above, i.e. the clutches C0 17, C1 28, and C2 29 and the brakes B0 18, B1 30, and B2 31, as well as the lock up clutch 6 for the torque converter assembly 2, is selectively engaged and disengaged by its hydraulic actuator system, by selective supply of hydraulic fluid pressure thereto in the combinations described in the Table from a control system which is an embodiment of the device aspect of the present invention functioning according to a corresponding embodiment of the method aspect of the present invention, according to speed change patterns determined in advance and based upon the current values of various operational parameters of the vehicle to which this automatic transmission 1 is fitted, such as vehicle road speed, engine load, range set by the vehicle driver on a manual range setting valve, and so on. And this selective supply of hydraulic fluid pressures is performed by a hydraulic control device which controls the supply of hydraulic fluid pressure to and the draining of said various hydraulic clutches and brakes detailed above, according to electrical control of said hydraulic control device which is performed by an electrical control device which includes a microprocessor. Thus, the various embodiments of the transmission control method and system of the present invention are all of the hybrid hydraulic/electronic type incorporating a microprocessor.

The First Preferred Embodiments

Figure 2:
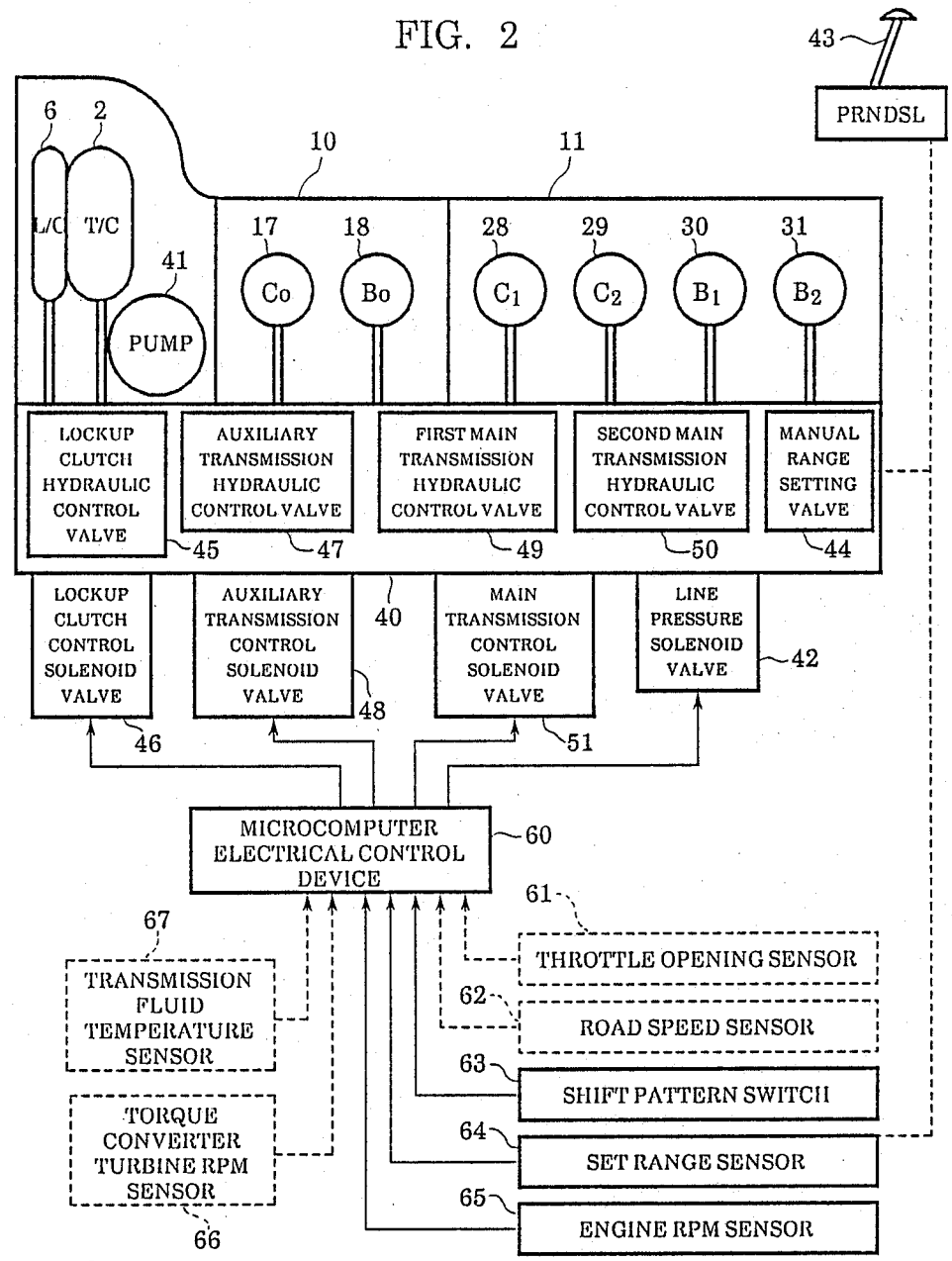
FIG. 2 is a schematic block diagram showing relevant parts of the first and alternatively the second through the fifth preferred embodiments of the transmission control system of the present invention, as applied to the FIG. 1 transmission.

In FIG. 2, and particularly in the parts thereof drawn in solid lines, a schematic block diagram of relevant parts of the first preferred embodiment of the transmission control system according to the present invention is shown; this figure also shows a block diagram of the transmission 1 to which this first preferred embodiment is provided.

In detail, in FIG. 2 the clutches C0 17, C1 28, and C2 29, the brakes B0 18, B1 30, and B2 31, and the torque converter assembly 2 and the lock up clutch 6 therefor, are shown as blocks, and a hydraulic control system generally denoted by the reference numeral 40 for controlling said various hydraulically actuated friction engaging elements receives supply of pressurized hydraulic fluid from a hydraulic fluid pump 41 which is driven by the internal combustion engine 100 drivingly connected to the pump impeller 3 of the torque converter assembly 2, and which picks up said hydraulic fluid from a sump, not particularly shown. This hydraulic pressure is supplied to a line pressure solenoid valve 42 which is controlled by a pulse signal whose duty ratio is determined by the electrical control device 60 (to be explained in more detail later) according to the rotational speed or the like of said internal combustion engine 100, and said line pressure solenoid valve 42 regulates said pressure to produce at its output side a stabilized line pressure. This line pressure is supplied to an input port of a manual range setting valve 44, which is per se conventional. A manual shift lever 43 is provided for being manually controlled by the vehicle driver for indicating the range in which said driver desires to operate the transmission, and this manual shift lever 43 controls via a linkage or the like a valve element (not particularly shown) of the manual range setting valve 44 and positions said valve element to any one of a plurality of positions each of which denotes one of the various ranges detailed in the Table, i.e. "D" or drive range, "S" or second range, "L" or low range, "R" or reverse range, "N" or neutral range, and "P" or parking range. This manual range setting valve 44 has various output ports, which are connected in various combinations to its said input port so as to receive supply of line pressure therefrom when the valve element of said manual range setting valve 44 is thus positioned to its various positions corresponding to these various ranges.

These output ports of this manual range setting valve 44 are connected via appropriate conduits to input ports of a lock up clutch hydraulic control valve 45 which is controlled by a lock up clutch control solenoid valve 46, of an auxiliary transmission hydraulic switching valve 47 which is controlled by an auxiliary transmission control solenoid valve 48, and of a first hydraulic switching valve 49 and a second hydraulic switching valve 50 which are together controlled by a main transmission control solenoid valve 51 The lock up clutch hydraulic control valve 45 is constructed as a spool valve and comprises a valve element not particularly shown, and, according to the positioning of said valve element to one position or another by the lock up clutch control solenoid valve 46 as will be explained hereinafter, either supplies the hydraulic pressure presented at its input port to its output port, from which said hydraulic pressure is conducted via a conduit to the lock up clutch 6 to control it, or drains its said output port, thus controlling said lock up clutch 6 according as to whether said lock up clutch control solenoid valve 46 is or is not supplied with an electrical signal. The auxiliary transmission hydraulic switching valve 47 is likewise constructed as a spool valve and comprises a valve element not particularly shown, and, according to positioning of said valve element to one or another position by the action of the auxiliary transmission control solenoid valve 48 as explained hereinafter, supplies the hydraulic pressure presented at its input port to one combination or another of its output ports, from which said combinations of hydraulic pressure are conducted via a conduit system not particularly shown to the clutch C0 17 and to the brake B0 18 of the auxiliary transmission 10 to control them, thus shifting said auxiliary transmission 10 either to its directly connected speed stage operational condition or to its overdrive speed stage operational condition, according as to whether said auxiliary transmission control solenoid valve 48 is or is not supplied with an electrical signal. And the main transmission first and second hydraulic switching valves 49 and 50 are likewise constructed as spool valves and comprise valve elements not particularly shown, and, according to positioning of said valve elements to one or other positions by the action of the main transmission control solenoid valve 51 as explained hereinafter, supply the hydraulic pressures presented at their input ports to one combination or another of their output ports, from which said combinations of hydraulic pressure are conducted via conduit systems not particularly shown to the clutches C1 28 and C2 29 and to the brakes B1 30 and B2 31 of the main transmission 11 to control them, thus shifting said main transmission 11 to any one of its directly connected forward speed stage operational condition or its two reducing forward speed stage operational conditions, according to the pulse ratio of the electrical signal supplied to said main transmission control solenoid valve 51 as described shortly.

In more detail, the lock up clutch hydraulic control valve 45 comprises a pressure chamber (not particularly shown) selective supply of hydraulic fluid pressure to which selectively biases the valve element of said lock up clutch hydraulic control valve 45 to and fro so as to hydraulically control the lock up clutch 6 as explained above, and this pressure chamber is selectively supplied with actuating hydraulic fluid pressure via a conduit from an output port of the lock up clutch control solenoid valve 46, which is an electromagnetic solenoid valve of a per se known type, and comprises a solenoid (not particularly shown) which is supplied with an electrical signal from an electrical control system which will be described hereinafter. For example, the lock up clutch control solenoid valve 46 may be so constituted that: when said solenoid thereof is supplied with a substantially zero electrical signal, it drains said pressure chamber of said lock up clutch hydraulic control valve 45, so that said lock up clutch 6 is disengaged; while, on the other hand, when said solenoid thereof is supplied with a high level electrical signal, it supplies substantially line pressure to said pressure chamber of said lock up clutch hydraulic control valve 45, so that said lock up clutch 6 is engaged.

Similarly, the auxiliary transmission hydraulic control valve 47 comprises a pressure chamber (not particularly shown) selective supply of hydraulic fluid pressure to which selectively biases the valve element of said auxiliary transmission hydraulic control valve 47 to and fro so as to hydraulically control the auxiliary transmission 10 as explained above, and this pressure chamber is selectively supplied with actuating hydraulic fluid pressure via a conduit from an output port of the auxiliary transmission control solenoid valve 48, which again is an electromagnetic solenoid valve of a per se known type, and comprises a solenoid (not particularly shown) which is supplied with an electrical signal from the electrical control system to be described hereinafter. For example, the auxiliary transmission control solenoid valve 48 may be so constituted that: when said solenoid thereof is supplied with a substantially zero electrical signal, it drains said pressure chamber of said auxiliary transmission hydraulic control valve 47, so that said auxiliary transmission 10 is set to the directly connected speed stage operational condition; while, on the other hand, when said solenoid thereof is supplied with a high level electrical signal, it supplies substantially line pressure to said pressure chamber of said auxiliary transmission hydraulic control valve 47, so that said auxiliary transmission 10 is set to the overdrive speed stage operational condition.

On the other hand, the first main transmission hydraulic control valve 49 comprises a pressure chamber (not particularly shown) supply of hydraulic fluid pressure less than or greater than a first determinate value P1 to which respectively biases the valve element of said first main transmission hydraulic control valve 49 either to or fro so as to selectively hydraulically control the clutches C1 28 and C2 29 of the first planetary gear mechanism 104 of the main transmission 10. Similarly, the second main transmission hydraulic control valve 50 comprises a pressure chamber (not particularly shown) supply of hydraulic fluid pressure less than or greater than a second determinate value P2 (greater than said first determinate value P1) to which respectively biases the valve element of said second main transmission hydraulic control valve 50 either to or fro so as to selectively hydraulically control the brakes B1 30 and B2 31 of the second planetary gear mechanism 105 of the main transmission 10. And these pressure chambers of these first and second main transmission hydraulic control valves 49 and 50 are both together supplied via a conduit with an actuating hydraulic fluid pressure from an output port of the main transmission control solenoid valve 51, which again is an electromagnetic solenoid valve of a per se known type, and comprises a solenoid (not particularly shown) which is supplied with a pulse electrical signal of a particularly determined duty ratio value from the electrical control system to be described hereinafter. For example, the main transmission control solenoid valve 51 may comprise a drain port and an input port supplied with line pressure, and when supplied with a high value electrical signal may connect its said output port to said input port to receive line pressure, while on the other hand when it is supplied with a low value electrical signal it connects its said output port to said drain port; so that, when said main transmission control solenoid valve 51 is supplied with a pulse signal of a first relatively low determinate duty ratio value, it connects its output port to drain for a relatively high proportion of the time and to supply of line pressure for a relatively low proportion of the time, so that the pressure supplied to the pressure chambers of the first and second main transmission hydraulic control valves 49 and 50 is of a relatively low pressure value lower than said first and second determinate pressure values P1 and P2, and in such a case neither of the first and second main transmission hydraulic control valves 49 and 50 is switched, so that said main gear transmission mechanism 11 is set to a first one of its three forward speed stages. On the other hand, when said main transmission control solenoid valve 51 is supplied with a pulse signal of a second intermediate determinate duty ratio value, it connects its output port to drain for an intermediate proportion of the time and to supply of line pressure for an intermediate proportion of the time, so that the pressure supplied to the pressure chambers of the first and second main transmission hydraulic control valves 49 and 50 is of an intermediate pressure value, higher than said first determinate pressure value P1 but lower than said second determinate pressure value P2; and in such a case the first main transmission hydraulic control valve 49 is switched but the second main transmission hydraulic control valve 50 is not switched, so that said main gear transmission mechanism 11 is set to a second one of its three forward speed stages. Further, when said main transmission control solenoid valve 51 is supplied with a pulse signal of a third relatively high determinate duty ratio value, it connects its output port to drain for a relatively low proportion of the time and to supply of line pressure for a relatively high proportion of the time, so that the pressure supplied to the pressure chambers of the first and second main transmission hydraulic control valves 49 and 50 is of a relatively high pressure value, higher than said first and said second determinate pressure values P1 and P2; and in such a case both of the first and second main transmission hydraulic control valves 49 and 50 are switched, so that said main gear transmission mechanism 11 is set to a third one of its three forward speed stages.

Such a system of speed switching valves and controlling solenoid valves has been proposed by the assignee or entity owed duty of assignment of the present patent application in Japanese Utility Model Application Ser. No. Sho. 55-26596 (1980), which has been published as Japanese Utility Model Publication Ser. No. Sho 58-38186 (1983), and in Japanese Patent Application Ser. No. Sho. 55-107260 (1980), which has been laid open as Japanese Patent Laying Open Publication Ser. No. Sho 56-24246 (1981), none of which is it intended to admit as prior art to the present patent application except to the extent otherwise required by applicable law, and if further details of the construction of this above described system are required reference should be made to the above identified documents.

In overall control of the automatic transmission there is provided a control system which in this first preferred embodiment of the present invention (in fact also in the other later disclosed embodiments) incorporates a microcomputer 60, shown in FIG. 2 simply by a block; this block, and the term "microcomputer 60", in fact are intended to include not only the microprocessor which performs the computing processes which will be described shortly but also the various I/O interfaces such as D/A and A/D converters and so on associated with said microprocessor, as well as perhaps other functionally related means. This microcomputer 60 controls the engagement and disengagement of all of the hydraulic clutches and brakes detailed above, via the electromagnetic solenoids 46, 48, 51 by outputting electrical control signals thereto as explained above, as well as the control of line pressure via the line pressure solenoid valve 42, which will not be further discussed herein.

Figure 3:
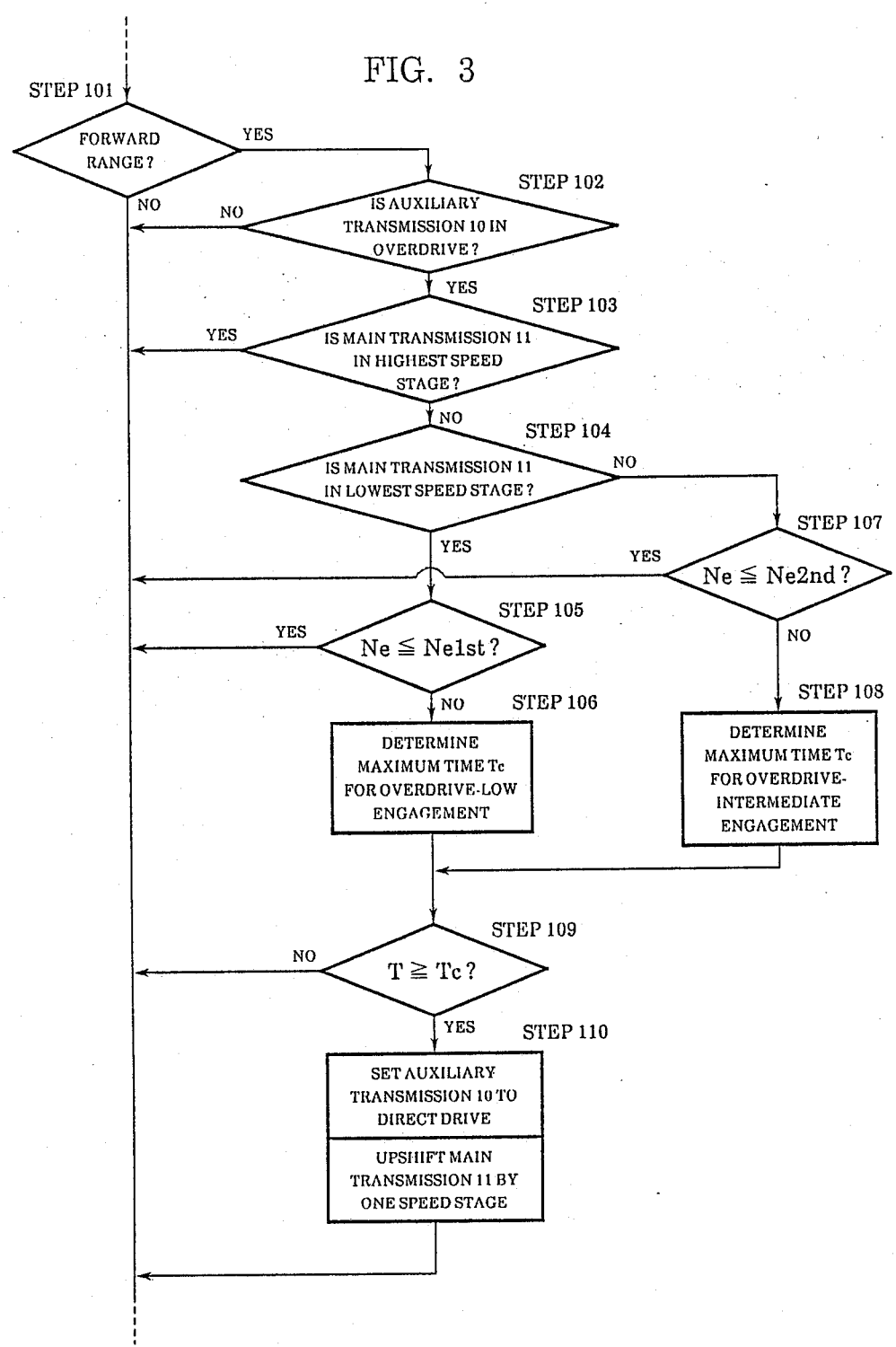
FIG. 3 is a flow chart for a portion of a transmission control program executed by a microprocessor incorporated in said first preferred embodiment of the transmission control system of the present invention, while performing the first preferred embodiment of the transmission control method of the present invention.

The microcomputer 60 receives input signals from sensors, including, in this first preferred embodiment, the following sensors shown by solid lines: a shift pattern switch 63, which is set to indicate what shift pattern it is desired should be currently employed by the transmission as a whole (such as a fuel economy type shift pattern or a power shift pattern); a set range sensor or switch 64, which is provided as appended to the manual shift lever 43, and which produces an output signal representative of what speed range is currently set on said manual shift lever 43; and an engine rotational speed sensor 65, which senses the rotational speed of the input shaft 101 of the fluid torque converter assembly 2 and produces an output signal representative thereof. (The elements 61, 62, 67, and 68, shown by double dashed lines, relate to other preferred embodiments of the present invention, and will be described later). And the microcomputer 60 repeatedly executes a control program for setting the various clutches and brakes detailed above to be engaged or disengaged, i.e. for setting the speed stage of the transmission mechanism as a whole. A portion of said control program will now be detailed, with reference to FIG. 3 which is a flow chart of said relevant portion. This portion of the program is executed at regular intervals, or once every time the crankshaft of the engine 100 rotates through a determinate angle, and implements the first preferred embodiment of the transmission control method of the present invention.

First, in the decision step 101, a test is made as to whether, as indicated by the set range sensor 64, the manual range setting valve 44 is currently positioned by the driver of the vehicle to a forward driving range, i.e. to the drive or "D" range, the second or "S" range, or the low or "L" range. If the answer to this test is NO, so that the vehicle is not being operated in a forward driving mode, then the flow of control passes to leave this program fragment, without doing anything further; but, if the answer to this test is YES, so that the vehicle is in fact being operated in a forward driving range, then the flow of control passes next to the step 102.

In this decision step 102, a test is made as to whether the auxiliary gear transmission mechanism 10 is currently being engaged to the overdrive speed stage, or not; this decision is made based upon the values of various flags or the like, not particularly described, maintained by other parts of the program which engage said auxiliary gear transmission mechanism 10 to its various stages. If the answer to this test is NO, so that at this time the auxiliary gear transmission mechanism 10 is currently set to the directly connected speed stage operational condition, then the flow of program control passes to leave this program fragment, without doing anything further; but, if the answer to this test is YES, so that it is established that in fact the auxiliary gear transmission mechanism 10 is currently being engaged to the overdrive speed stage, then the flow of control passes next to the step 103.

In this step 103, a test is made as to whether the main gear transmission mechanism 11 is currently set to its highest speed stage, i.e. is currently being engaged to its directly connected speed stage, or not; again, this decision is made based upon the values of various flags or the like, not particularly described, maintained by other parts of the program which engage said main gear transmission mechanism 11 to its various stages. If the answer to this test is YES, so that the main gear transmission mechanism 11 is in fact currently being engaged to its highest speed stage, then the flow of control passes to leave this program fragment, without doing anything further (this is done in order that this program fragment should not interfere at all with the normal type of overdrive operation of the transmission as a whole in its highest or sixth speed stage); but, if the answer to this test is NO, so that in fact the main gear transmission mechanism 11 is currently being engaged either to its lowest or to its intermediate speed stage, then the flow of program control passes next to the step 104.

In this step 104, a test is made as to whether the main gear transmission mechanism 11 is currently set to its lowest speed stage, or not. If the answer to this test is YES, so that the main gear transmission mechanism 11 is in fact currently being engaged to its lowest speed stage, then the flow of program control passes next to the decision step 105; but, if the answer to this test is NO, so that in fact the main gear transmission mechanism 11 is currently being engaged to its intermediate speed stage, then the flow of program control passes next to the decision step 107.

In the decision step 105, at which point it is established that the main gear transmission mechanism 11 is currently being engaged to its lowest speed stage and the auxiliary gear transmission mechanism 10 is currently being engaged to its overdrive or speed increasing speed stage, a test is made as to whether the rotational speed Ne of the internal combustion engine 100, as determined from the output signal from the engine rotational speed sensor 65, is currently less than a first certain determinate threshold value Ne1st, or not. If the answer to this test is YES, then the performance of time limit overdrive restriction control is not currently necessary or required, and the flow of control passes to leave this program fragment, without doing anything further; but, if the answer to this test is NO, so that in fact the engine rotational speed is higher than this threshold value Ne1st, then the flow of control passes next to the step 106.

Figure 4:
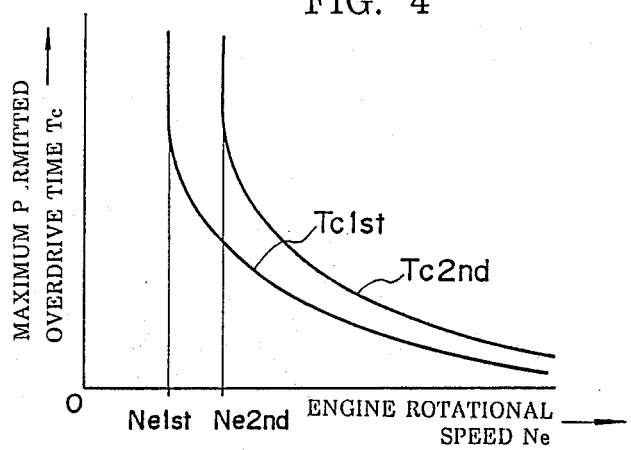
FIG. 4 is a chart showing overdrive permitted time characteristics for the first preferred embodiments of the transmission control system and method of the present invention, in which Ne, the engine rotational speed in rpm, is shown along the horizontal axis and Tc, the maximum permitted time for said overdrive mechanism to stay in the overdrive condition, is shown along the vertical axis.

In this step 106, the overdrive maximum permitted time period Tc for the auxiliary gear transmission mechanism 10 to be in the overdrive operational condition, in this case that the main gear transmission mechanism 11 is currently engaged to its lowest speed stage, is determined according to a first characteristic curve as exemplarily shown in FIG. 4; and then the flow of program control passes next to the decision step 109. Generally, the higher is the value of the engine rotational speed Ne, the lower will be the maximum time Tc that the auxiliary gear transmission mechanism 10 will be allowed to be set to the overdrive operational condition, for this case that the main gear transmission mechanism 11 is currently being engaged to its lowest speed stage.

Similarly, in the other program branch in the decision step 107, at which point it is established that the main gear transmission mechanism 11 is currently being engaged to its intermediate speed stage and the auxiliary gear transmission mechanism 10 is currently being engaged to its overdrive or speed increasing speed stage, a test is made as to whether the rotational speed Ne of the internal combustion engine 100, again as determined from the output signal from the engine rotational speed sensor 65, is currently less than a second certain determinate threshold value Ne2nd (which is greater than the abovementioned first determinate value Ne1st), or not. If the answer to this test is YES, then again the performance of time limit overdrive restriction control is not currently necessary or required, and the flow of control passes to leave this program fragment, without doing anything further; but, if the answer to this test is NO, so that in fact the engine rotational speed Ne is higher than this second determinate threshold value Ne2nd, then the flow of program control passes next to the step 108.

In this step 108, similarly to what was done in the previous step 106, the overdrive maximum permitted time period Tc for the auxiliary gear transmission mechanism 10 to be in the overdrive operational condition, in this case that the main gear transmission mechanism 11 is currently being engaged to its intermediate speed stage, is determined according to a second characteristic curve as also exemplarily shown in FIG. 4; and then as before the flow of program control passes next to the decision step 109. As before, generally, the higher is the engine rotational speed Ne, the lower will be the maximum time Tc that the auxiliary gear transmission mechanism 10 will be allowed to be set to the overdrive operational condition, also for this case that the main gear transmission mechanism 11 is currently being engaged to its intermediate speed stage; and, for the same engine rotational speed Ne, the maximum time Tc that the auxiliary gear transmission mechanism 10 would be allowed to be set to the overdrive operational condition in this case that the the main gear transmission mechanism 11 is being engaged to its intermediate speed stage, as determined from the Tc2nd line in FIG. 4, is substantially longer than the maximum time Tc that the auxiliary gear transmission mechanism 10 would be allowed to be set to the overdrive operational condition in the contrasting case that the the main gear transmission mechanism 11 were engaged to its lowest speed stage as determined from the Tc1st line in FIG. 4.

In this decision step 109, a test is made as to whether the time that the auxiliary gear transmission mechanism 10 has been set to the overdrive operational condition up till now has become greater than or equal to the above determined maximum permissible time Tc therefor, or not. If the answer to this test is NO, then the flow of program control passes to leave this program fragment, without doing anything further; but, if the answer to this test is YES, so that in fact this maximum permissible time Tc has now been reached, then the flow of control passes next to the step 110.

In this step 110, at which point it has been determined that the maximum time limit Tc at this time for engagement of the overdrive speed of the auxiliary gear transmission mechanism 10 has been exceeded, said auxiliary gear transmission mechanism 10 is forcibly set to its directly connected speed stage operational condition, and further the main gear transmission mechanism 11 is forcibly upshifted by one speed stage, i.e. is shifted to its intermediate speed stage in the event that it is in its lowest speed stage, or is shifted to its highest or directly connected speed stage in the event that it is in its intermediate speed stage. Thereby, the relative rotational speeds of the various mutually rotating elements in said main gear transmission mechanism 11 are generally reduced, and thus the wear thereon is reduced. And then the flow of program control leaves this program portion.

Thus, according to the operation of this program fragment, the state of affairs in which the main gear transmission mechanism 11 is in its lowest speed stage and the auxiliary gear transmission mechanism 10 is in its overdrive speed stage (so that the transmission as a whole is in its second speed stage) and the engine rotational speed Ne is currently greater than the first determinate threshold value Ne1st, is only allowed to continue for up to the time period Tc1st as determined by the Tc1st line in FIG. 4, and at the end of this time period Tc1st the auxiliary gear transmission mechanism 10 is shifted down to the directly connected speed stage and the main gear transmission mechanism 11 is shifted up one speed stage so as to be in its intermediate speed stage, thus setting the transmission as a whole to its third speed stage, i.e. shifting said transmission as a whole up by one speed stage from its second to its third speed stage. Similarly, the state of affairs in which the main gear transmission mechanism 11 is in its intermediate speed stage and the auxiliary gear transmission mechanism 10 is in its overdrive speed stage (so that the transmission as a whole is in its fourth speed stage) and the engine rotational speed Ne is currently greater than the second determinate threshold value Ne2nd, is only allowed to continue for up to the time period Tc2nd as determined by the Tc2nd line in FIG. 4, and at the end of this time period Tc2nd the auxiliary gear transmission mechanism 10 is shifted down to the directly connected speed stage and the main gear transmission mechanism 11 is shifted up one speed stage so as to be in its highest speed stage, thus setting the transmission as a whole to its fifth speed stage, i.e. shifting said transmission as a whole up by one speed stage from its fourth to its fifth speed stage. The effect of this operation is to reduce the relative rotational speeds of the various mutually rotating elements in the main gear transmission mechanism 11, such as the gears and shafts therein and the elements of the planetary gear mechanisms thereof, and thus to reduce the wear thereon.

The Second Preferred Embodiments

Now, the second preferred embodiments of the system and method of the present invention will be described. In this connection, the gear train of the transmission which is controlled by this control system and method is the same one as described above with reference to FIG. 1, and the physical components of the transmission control system are the same as in the first preferred embodiments described above and shown in FIG. 2, except for the fact that, as illustrated by some of the double dashed lines in that figure, the microcomputer 60 receives an input signal from a torque converter turbine member rotational speed sensor 66, which senses the common rotational speed of the turbine member 4 and of the output shaft 9 of the fluid torque converter assembly 2 and produces an output signal representative thereof. Accordingly in these second preferred embodiments the previously provided engine rotational speed sensor 65 which senses the rotational speed of the internal combustion engine 100 may be omitted, at least as far as the present invention is concerned. And the flow chart for the portion of the control program executed by this microcomputer 60 relating to the engagement and disengagement of the various transmission clutches and brakes, by supply of actuating electrical signals to the electromagnetic solenoid valves 48 and 51, to implement the second preferred embodiments of the transmission control method and system of the present invention, is similar to the flow chart detailed in FIG. 3 above, except that the determinations of the maximum permitted times Tc1st and Tc2nd in the steps 106 and 108 are performed based upon the rotational speed of the turbine member 4 of the fluid torque converter assembly 2, according to characteristic lines thereof similar to those shown in FIG. 4 for the first preferred embodiments; also, the decisions in the decision steps 105 and 107 should be performed based upon threshold values for said turbine member rotational speed. The same advantages and benefits are obtained with this operation, as were available with the first preferred embodiment described above; and hence detailed description thereof will be foregone.

The Third Preferred Embodiments

As another possible variation which constitutes the third preferred embodiment of the system and method of the present invention will be described. Again, the gear train of the transmission which is controlled by this control system and method is the same one as described above with reference to FIG. 1. The physical components of the transmission control system are the same as in the first and second preferred embodiments described above and shown in FIG. 2, except for the fact that, as illustrated by another combination of the double dashed lines in that figure, the microcomputer 60 receives an input signal from a vehicle road speed sensor 62, which senses the road speed of the vehicle, i.e. usually of the output shaft 8 of the transmission, and produces an output signal representative thereof. Again, the flow chart for the portion of the control program executed by this microcomputer 60, to implement the third preferred embodiments of the transmission control method and system of the present invention, is similar to the flow chart detailed in FIG. 3 above, except that the determinations of the maximum permitted times Tc1st and Tc2nd in the steps 106 and 108 are performed based upon the road speed of the vehicle, again according to characteristic lines thereof similar to those shown in FIG. 4 for the first preferred embodiments; also, the decisions in the decision steps 105 and 107 should be performed based upon threshold values for said vehicle road speed. The same advantages and benefits are obtained with this operation, as were available with the first and second preferred embodiments described above; and hence detailed description thereof will be foregone.

The Fourth Preferred Embodiments

Figure 5:
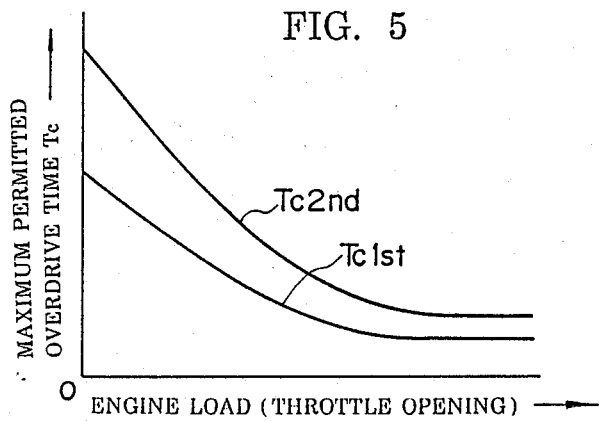
FIG. 5 is a chart, similar to FIG. 4 for the first preferred embodiments, showing overdrive permitted time characteristics for the fourth preferred embodiments of the transmission control system and method of the present invention, in which throttle opening amount (taken as an indication of engine load) is shown along the horizontal axis and Tc, the maximum permitted time for said overdrive mechanism to stay in the overdrive condition, is shown along the vertical axis.

With the first through the third preferred embodiments of the present invention as disclosed above, the graph of FIG. 4 was generally applicable, mutatis mutandis. However, now another possible variation which constitutes the fourth preferred embodiment of the system and method of the present invention will be described. Again, the gear train of the transmission which is controlled by this control system and method is the same one as described above with reference to FIG. 1. The physical components of the transmission control system are the same as in the first through the third preferred embodiments described above and shown in FIG. 2, except for the fact that, as illustrated by another combination of the double dashed lines in that figure, the microcomputer 60 receives an input signal from a throttle opening sensor 61, which senses the amount of depression of the accelerator pedal of the vehicle (which is taken as an indication of engine load), and produces an output signal representative thereof. Again, the flow chart for the portion of the control program executed by this microcomputer 60, to implement the fourth preferred embodiments of the transmission control method and system of the present invention, is similar to the flow chart detailed in FIG. 3 above, except that the determinations of the maximum permitted times Tc1st and Tc2nd in the steps 106 and 108 are performed based upon the engine load, this time according to characteristic lines thereof as exemplarily shown in FIG. 5; also, the decisions in the decision steps 105 and 107 should be performed based upon threshold values for engine load. The maximum permitted time Tc for engagement of the second or the fourth speed stage of the overall transmission mechanism is in this case lower, the higher is the engine load; this is done due to the larger torque inevitably acting upon the components of the main transmission mechanism. Similar advantages and benefits are obtained with this operation, as were available with the first through the third preferred embodiments described above.

The Fifth Preferred Embodiments

Figure 6:
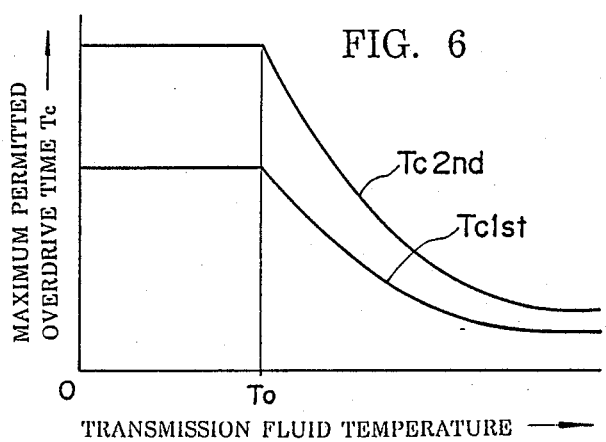
FIG. 6 is a chart, similar to FIGS. 4 and 5 for the first and fourth preferred embodiments respectively, showing overdrive permitted time characteristics for the fifth preferred embodiments of the transmission control system and method of the present invention, in which transmission fluid temperature is shown along the horizontal axis and Tc, the maximum permitted time for said overdrive mechanism to stay in the overdrive condition, is shown along the vertical axis.

Finally, now the fifth preferred embodiments of the system and method of the present invention will be described. Again, the gear train of the transmission which is controlled by this control system and method is the same one as described above with reference to FIG. 1; and the physical components of the transmission control system are the same as in the other preferred embodiments described above and shown in FIG. 2, except for the fact that, as illustrated by yet another combination of the double dashed lines in that figure, the microcomputer 60 receives an input signal from a transmission fluid temperature sensor 67, which senses the temperature of the lubricating hydraulic fluid in the transmission mechanism, and produces an output signal representative thereof. Again, the flow chart for the portion of the control program executed by this microcomputer 60, to implement the fourth preferred embodiments of the transmission control method and system of the present invention, is similar to the flow chart detailed in FIG. 3 above, except that the determinations of the maximum permitted times Tc1st and Tc2nd in the steps 106 and 108 are performed based upon the transmission fluid temperature, this time according to characteristic lines thereof as exemplarily shown in FIG. 6; also, the decisions in the decision steps 105 and 107 should be performed based upon threshold values for transmission fluid temperature. The maximum permitted time Tc for engagement of the second or the fourth speed stage of the overall transmission mechanism is in this case constant with increasing transmission fluid temperature, up to a determinate transmission fluid temperature T0; and thereafter, above said determinate temperature T0, decreases with increasing transmission fluid temperature; this is done due to the increase in leakage of lubricating transmission fluid with increase in temperature thereof, which means that the stress imposed upon the components of the main transmission mechanism should be accordingly diminished. Similar advantages and benefits are obtained with this operation, as were available with the first through the fourth preferred embodiments described above.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

TABLE

| Range and Speed Stage | C1 28 | C2 29 | C0 17 | B1 30 | B2 31 | B0 18 | F1 32 | F0 16 |
|---|---|---|---|---|---|---|---|---|
| P range | X | X | O | X | X | X | F | F |
| R range | X | O | O | X | O | X | F | O |
| N range | X | X | O | X | X | X | F | F |
| D range | | | | | | | | |
| 1st | O | X | O | X | X | X | O | O |
| 2nd | O | X | X | X | X | O | O | F |
| 3rd | O | X | O | O | X | X | F | O |
| 4th | O | X | X | O | X | O | F | F |
| 5th | O | O | O | X | X | X | F | O |
| 6th | O | O | X | X | X | O | F | F |
| S range | | | | | | | | |
| 1st | O | X | O | X | X | X | O | O |
| 2nd | O | X | X | X | O | O | O | F |
| 3rd | O | X | O | O | X | X | F | O |
| L range | | | | | | | | |
| 1st | O | X | O | X | O | X | O | O |
| 2nd | O | X | X | X | O | O | O | F |

What is claimed is:

1. A transmission control method for an automatic transmission of a vehicle, said transmission comprising:
   (a) an auxiliary gear transmission mechanism, comprising a power input shaft and a power output shaft, and switchingly controllable to provide either a directly connected speed stage between its said power input shaft and its said power output shaft or a speed increasing overdrive speed stage between its said power input shaft and its said power output shaft, and;
   (b) a main gear transmission mechanism, comprising a power input shaft rotationally connected to said power output shaft of said auxiliary gear transmission mechanism and a power output shaft, and switchingly controllable to provide either a directly connected speed stage between its said power input shaft and its said power output shaft or at least one speed reducing speed stage between its said power input shaft and its said power output shaft;
   said method, comprising the steps of:
   (c) switching said auxiliary gear transmission mechanism between providing its said directly connected speed stage and providing its said speed increasing overdrive speed stage, both when said main gear transmission mechanism is switched to provide its said directly connected speed stage and when said main gear transmission mechanism is switched to its said speed reducing speed stage, so as to provide a series of speed stages of varying gear ratios by various combinations of said directly connected speed stage and said speed increasing overdrive speed stage of said auxiliary gear transmission mechanism and said directly connected speed stage and said speed reducing speed stage or stages of said main gear transmission mechanism, according to said vehicle operational parameters, and;
   (d) setting a maximum time limit period over which said auxiliary gear transmission mechanism is switched to provide its said speed increasing overdrive speed stage when said main gear transmission mechanism is switched to provide its said speed reducing speed stage, such a maximum period being determined according to a vehicle operational parameter.

2. A method of transmission control according to claim 1, wherein, at the end of said maximum period said auxiliary gear transmission mechanism is switched to provide its said directly connected speed stage and said main gear transmission mechanism is shifted up by one speed stage.

3. A method of transmission control according to claim 1, wherein said vehicle operational parameter is engine rotational speed.

4. A method of transmission control according to claim 3, wherein said maximum period is determined to be a monotonically decreasing function of engine power output shaft rotational speed.

5. A method of transmission control according to claim 3, wherein, when engine power output shaft rotational speed is less than a determinate engine power output shaft rotational speed value, said maximum period is infinite.

6. A method of transmission control according to claim 3, said main gear transmission mechanism further being switchingly controllable to provide a higher first speed reducing speed stage between its said power input shaft and its said power output shaft and a lower second speed reducing speed stage between its said power input shaft and its said power output shaft, wherein: with said main gear transmission mechanism being switched to provide said higher first speed reducing speed stage, when engine power output shaft rotational speed is less than a first determinate engine power output shaft rotational speed value said maximum period is infinite, and, with said main gear transmission mechanism being switched to provide said lower second speed reducing speed stage, when engine power output shaft rotational speed is less than a second determinate engine power output shaft rotational speed value said maximum period is infinite; said second determinate engine power output shaft rotational speed value being lower than said first determinate engine power output shaft rotational speed value.

7. A method of transmission control according to claim 1, wherein said vehicle operational parameter is a rotational speed of a rotating transmission element.

8. A method of transmission control according to claim 7, wherein said maximum period is determined to be a monotonically decreasing function of rotational speed of said rotating transmission element.

9. A method of transmission control according to claim 7, wherein, when rotational speed of said rotating transmission element is less than a determinate rotational speed value, said maximum period is infinite.

10. A method of transmission control according to claim 7, said main gear transmission mechanism further being switchingly controllable to provide a higher first speed reducing speed stage between its said power input shaft and its said power output shaft and a lower second speed reducing speed stage between its said power input shaft and its said power output shaft, wherein: with said main gear transmission mechanism being switched to provide said higher first speed reducing speed stage, when rotational speed of said rotating transmission element is less than a first determinate transmission element rotational speed value said maximum period is infinite, and, with said main gear transmission mechanism being switched to provide said lower second speed reducing speed stage, when rotational speed of said rotating transmission element is less than a second determinate transmission element rotational speed value said maximum period is infinite; said second determinate transmission element rotational speed value being lower than said first determinate transmission element rotational speed value.

11. A method of transmission control according to claim 1, wherein said vehicle operational parameter is vehicle road speed.

12. A method of transmission control according to claim 11, wherein said maximum period is determined to be a monotonically decreasing function of vehicle road speed.

13. A method of transmission control according to claim 11, wherein, when vehicle road speed is less than a determinate vehicle road speed value, said maximum period is infinite.

14. A method of transmission control according to claim 11, said main gear transmission mechanism further being switchingly controllable to provide a higher first speed reducing speed stage between its said power input shaft and its said power output shaft and a lower second speed reducing speed stage between its said power input shaft and its said power output shaft, wherein: with said main gear transmission mechanism being switched to provide said higher first speed reducing speed stage, when vehicle road speed is less than a first determinate vehicle road speed value said maximum period is infinite, and, with said main gear transmission mechanism being switched to provide said lower second speed reducing speed stage, when vehicle road speed is less than a second determinate vehicle road speed value said maximum period is infinite; said second determinate vehicle road speed value being lower than said first determinate vehicle road speed value.

15. A method of transmission control according to claim 1, wherein said vehicle operational parameter is a value representing engine load.

16. A method of transmission control according to claim 15, wherein said maximum period is determined to be a monotonically decreasing function of engine load.

17. A method of transmission control according to claim 1, wherein said vehicle operational parameter is transmission fluid temperature.

18. A method of transmission control according to claim 17, wherein said maximum period is determined to be a monotonically decreasing function of transmission fluid temperature.

19. A transmission control system for automatic transmission of a vehicle, said transmission comprising:
(a) an auxiliary gear transmission mechanism, comprising a power input shaft and a power output shaft, and switchingly controllable to provide either a directly connected speed stage between its said power input shaft and its said power output shaft or a speed increasing overdrive speed stage between its said power input shaft and its said power output shaft, and;
(b) a main gear transmission mechanism, comprising a power input shaft rotationally connected to said power output shaft of said auxiliary gear transmission mechanism and a power output shaft, and switchingly controllable to provide either a directly connected speed stage between its said power input shaft and its said power output shaft or at least one speed reducing speed stage between its said power input shaft and its said power output shaft;

said system comprising:
(c) a means for switching said auxiliary gear transmission mechanism between its said directly connected speed stage and its said speed increasing overdrive speed stage according to vehicle operational parameters, both when said main gear transmission mechanism is switched to its said directly connected speed stage and when said main gear transmission mechanism is switched to its said speed reducing speed stage, so as to provide a series of speed stages of varying gear ratios by various combinations of said directly connected speed stage and said speed increasing overdrive speed stage of said auxiliary gear transmission mechanism and said directly connected speed stage and said speed reducing speed stage or stages of said main gear transmission mechanism, and;

(d) a means for setting a maximum limit period for which said auxiliary gear transmission mechanism is switched to provide its said speed increasing overdrive speed stage when said main gear transmission mechanism is switched to provide its said speed reducing speed stage, said maximum period being determined according to a vehicle operational parameter.

20. A system for transmission control according to claim 19, further comprising a means for, at the end of said maximum period switching said auxiliary gear transmission mechanism to provide its said directly connected speed stage and shifting said main gear transmission mechanism up by one speed stage.

21. A system for transmission control according to claim 19, wherein said vehicle operational parameter is engine rotational speed.

22. A system for transmission control according to claim 21, wherein said determining means determines said maximum period to be a monotonically decreasing function of engine power output shaft rotational speed.

23. A system for transmission control according to claim 21, wherein, when engine power output shaft rotational speed is less than a determinate engine power output shaft rotational speed value, said maximum period is infinite.

24. A system for transmission control according to claim 21, said main gear transmission mechanism further being switchingly controllable to provide a higher first speed reducing speed stage between its said power input shaft and its said power output shaft and a lower second speed reducing speed stage between its said power input shaft and its said power output shaft, wherein: with said main gear transmission mechanism being switched to provide said higher first speed reducing speed stage, when engine power output shaft rotational speed is less than a first determinate engine power output shaft rotational speed value said maximum period is infinite, and, with said main gear transmission mechanism being switched to provide said lower second speed reducing speed stage, when engine power output shaft rotational speed is less than a second determinate engine power output shaft rotational speed value said maximum period is infinite; said second determinate engine power output shaft rotational speed value being lower than said first determinate engine power output shaft rotational speed value.

25. A system for transmission control according to claim 19, wherein said vehicle operational parameter is a rotational speed of a rotating transmission element.

26. A system for transmission control according to claim 25, wherein said determining means determines said maximum period to be a monotonically decreasing function of rotational speed of said rotating transmission element.

27. A system for transmission control according to claim 25, wherein, when rotational speed of said rotating transmission element is less than a determinate rotational speed value, said maximum period is infinite.

28. A system for transmission control according to claim 25, said main gear transmission mechanism further being switchingly controllable to provide a higher first speed reducing speed stage between its said power input shaft and its said power output shaft and a lower second speed reducing speed stage between its said power input shaft and its said power output shaft, wherein: with said main gear transmission mechanism being switched to provide said higher first speed reducing speed stage, when rotational speed of said rotating transmission element is less than a first determinate transmission element rotational speed value said maximum period is infinite, and, with said main gear transmission mechanism being switched to provide said lower second speed reducing speed stage, when rotational speed of said rotating transmission element is less than a second determinate transmission element rotational speed value said maximum period is infinite; said second determinate transmission element rotational speed value being lower than said first determinate transmission element rotational speed value.

29. A system for transmission control according to claim 24, wherein said vehicle operational parameter is vehicle road speed.

30. A system for transmission control according to claim 29, wherein said determining means determines said maximum period to be a monotonically decreasing function of vehicle road speed.

31. A system for transmission control according to claim 29, wherein, when vehicle road speed is less than a determinate vehicle road speed value, said maximum period is infinite.

32. A system for transmission control according to claim 29, said main gear transmission mechanism further being switchingly controllable to provide a higher first speed reducing speed stage between its said power input shaft and its said power output shaft and a lower second speed reducing speed stage between its said power input shaft and its said power output shaft, wherein: with said main gear transmission mechanism being switched to provide said higher first speed reducing speed stage, when vehicle road speed is less than a first determinate vehicle road speed value said maximum period is infinite, and, with said main gear transmission mechanism being switched to provide said lower second speed reducing speed stage, when vehicle road speed is less than a second determinate vehicle road speed value said maximum period is infinite; said second determinate vehicle road speed value being lower than said first determinate vehicle road speed value.

33. A system for transmission control according to claim 19, wherein said vehicle operational parameter is a value representing engine load.

34. A system for transmission control according to claim 33, wherein said determining means determines said maximum period to be a monotonically decreasing function of engine load.

35. A system for transmission control according to claim 19, wherein said vehicle operational parameter is transmission fluid temperature.

36. A system for transmission control according to claim 35, wherein said determining means determines said maximum period to be a monotonically decreasing function of transmission fluid temperature.

* * * * *